United States Patent Office 3,275,304
Patented Sept. 27, 1966

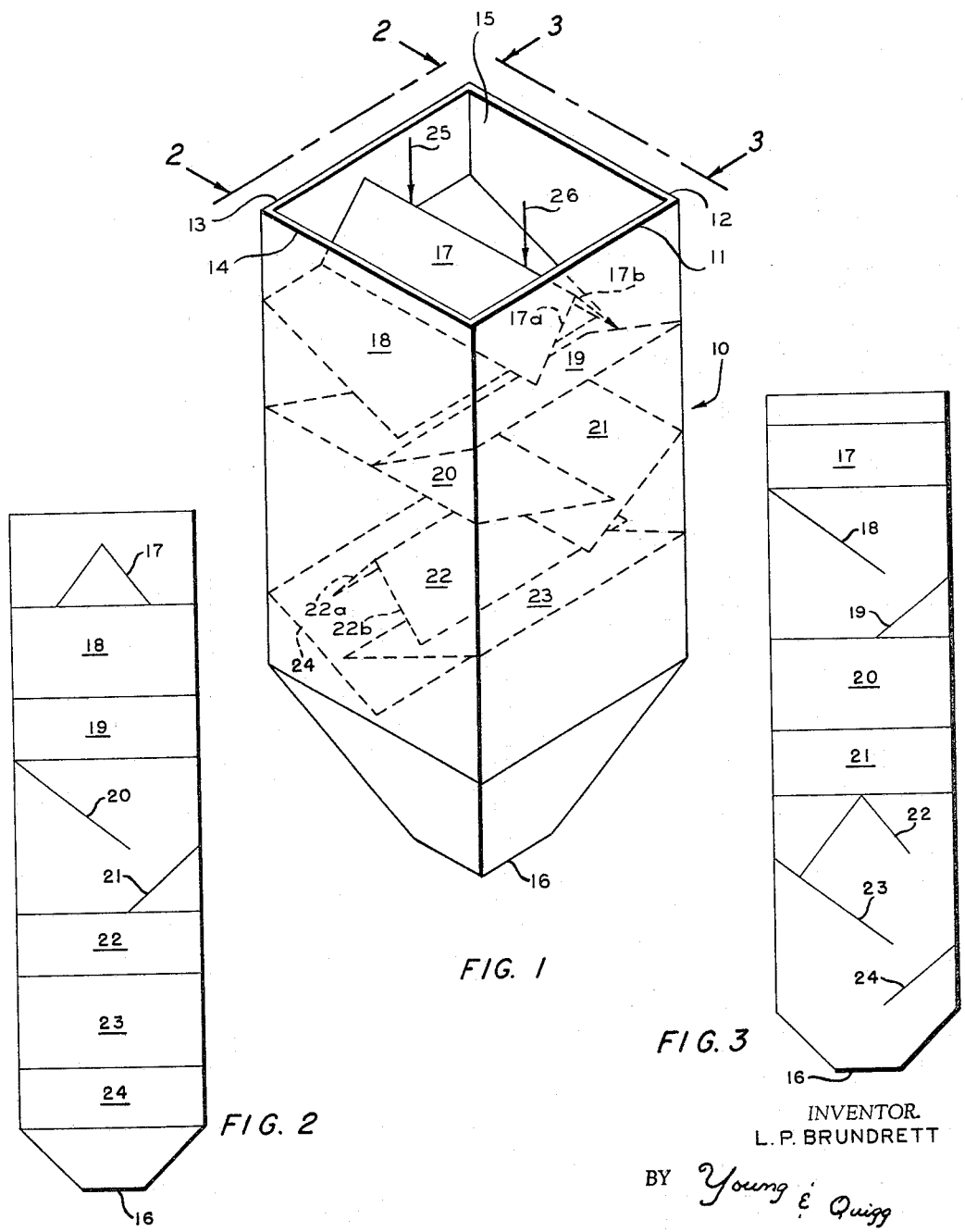

3,275,304
BLENDING APPARATUS
Leon P. Brundrett, Houston, Tex., assignor to Phillips Petroleum Company, a corporation of Delaware
Filed June 8, 1964, Ser. No. 373,472
2 Claims. (Cl. 259—180)

This invention relates to a blending apparatus for mixing two or more components. More specifically, this invention relates to a novel apparatus for achieving near perfect blending of particulate, free flowing, granular materials.

Processors of plastics have long been plagued by erratic extrusion and molding characteristics in resin batches shipped from manufacturers. Their experience has been that the properties of resin contained in even a single shipment can vary significantly. A sudden change in properties during formation of film with high-speed machines can cause fracture or a breaking of the film or development of haze therein; similarly, in injection molding partial filling of molds is the likely result of resin variations. Obviously, these failures are costly to the processor and ultimately to the manufacturer.

Variations in resin properties from batch to batch are inherent in presently known manufacturing techniques where polymerization conditions are not perfectly reproducible. After manufacture, the diced, granulated, or otherwise particulated resin is conveyed to large storage bins or hoppers where successive additions form contiguous layers. In the usual manufacturing plant particulate material is reconveyed several times to different bins in the course of routine handling. Despite a number of transfers from bin to bin, the stratified condition of bin contents is only slightly changed. Blending of adjacent layers of material is nearly negligible. The usual shipment of resin to a processor represents only a portion of the bin contents and more likely than not, several strata differing incrementally will be shipped. The result is insidious and unpredictable changes in processing behavior and unsatisfactory performance.

Although the properties of the resin in the different stata do not widely or ordinarily critically vary, changes in resin quality can and do occur. Because the changes are generally incremental, they are not readily noticed and the result is the possible use of a large quantity of resin in making a substandard product. While it is true that timely adjustment of temperature and pressure on the fabricating equipment can avoid this result, the incremental nature of the changes makes them difficult to detect until their cumulative effect is apparent. Uniform blending of the differing materials would eliminate this problem.

Methods presently used by resin manufacturers to blend superposed contiguous layers of particulate material are broadly divisible into power-operated devices and gravity-operated devices. The first group includes tumbling blenders, such as double cone blenders, and deep flight screws. The former device is well-adapted to blending great quantities of resin material but is extremely expensive initially and cannot double conveniently as a storage bin since it must be kept available for blending use, so that a storage bin is also required. The latter device is effective only with undesirably long mixing times. Both of these devices, which are typical of power-operated blending equipment, are costly to install, space consuming, and require operators, continual maintenance and also additional conveying equipment.

Gravity-operated devices are commonly specially constructed bins or hoppers usually possessing a critical feature such as a particular slope for the walls, restricted number and depth of contiguous layers, etc. These devices are economical to operate and maintain but are sometimes expensive to construct, particularly in existing facilities. It has been found, however, that known gravity-operated blending hoppers used in coal industries and the like lack the flexibility required by resin manufacturers. The blending problem encountered in the resin industry involves averaging out of minor changes in properties to eliminate the above-described insidious variations encountered in fabrication. Therefore, blending hoppers which are based on the principle of carefully arranged layers of material of known composition are unsuited to resin blending.

To produce an acceptably uniform blend, it is necessary to commingle intimately all the component resins. Suitable equipment must positively intermix all the contents of the bin regardless of their respective proportions within the bin. Important too is accomplishing such intermixing and blending with as few extra handling steps as possible, and preferably with no extended handling beyond the ordinary routine handling accorded every batch of resin.

It is an object of my invention to provide blending apparatus having a novel arrangement of baffles adapted to achieve very nearly homogeneous blends of particulate materials. It is another object of the invention to provide apparatus which inexpensively and efficiently blends great quantities of particulate material without benefit of powered agitation. It is still another object to blend particulate resin materials adequately almost completely during the routine handling thereof. Other objects, advantages and features of my invention will be readily apparent from a study of the disclosure, the drawings and the appended claims.

In accordance with the present invention, I have discovered that a near perfect blend can be achieved by the use of a blending apparatus comprising a chamber having disposed therein a plurality of superposed baffles which are so adapted as to achieve a generally cascade flow therethrough.

A full description of my invention is given herewith in conjunction with the attached drawings, in which:

FIGURE 1 is a schematic view of a specific design of the blending apparatus;

FIGURE 2 is a schematic view of the position of the baffles within the apparatus of FIGURE 1 along the plane 2; and FIGURE 3 is a schematic view of the position of the baffles within the apparatus of FIGURE 1 along the plane 3.

Referring to FIGURE 1, the apparatus comprises a chamber 10 having sides 11, 12, 13 and 14 forming an opening 15 at the top and an outlet 16 at the bottom. Outlet 16 can be provided with means (not shown) for controlling the rate of outflow from the chamber 10. Within the chamber is a plurality of baffles superposed and vertically spaced one above the other. Eight baffles 17, 18, 19, 20, 21, 22, 23 and 24 are shown in FIGURE 1. While this is the preferred number of baffles, baffles 23 and 24 can be omitted. However, the presence of baffles 23 and 24 doubles the probability of reaching a perfect blend. Two sides can be hinged for cleanout. The respective position of the baffles within the chamber 10 can best be described in conjunction with FIGURES 2 and 3, which are views along the planes A and B, respectively, of the apparatus of FIGURE 1.

Baffle 17 along plane A is a flow dividing baffle having a V shape which serves to divide the incoming material into two streams. Baffle 18 is attached at an upper edge thereof to wall 13 at a point adjacent the lower edge of dividing baffle means 17 and serves to direct a portion of the divided streams passing over plate 17 to baffle 19, which is positioned below baffle 18 and adapted to direct the flow of material over same downwardly toward the interior of the chamber 10. Baffles 20 and 21 are positioned below and adapted to direct flow downwardly in a manner similar to that of baffles 18 and 19, but are attached at the upper ends thereof to walls 14 and 12, respectively. Baffle 22 as illustrated in the drawings is a second flow-dividing baffle composed of two sheets attached to walls 14 and 12 at a point adjacent to and below baffle plate 21. The position of the second flow divider 22 is athwart that the flow-dividing baffle 17. Baffles 23 and 24 are likewise downwardly directing baffles. Baffle 23 directs a portion of the flow to baffle 24 which in turn directs the flow to outlet 16.

While the drawings illustrate the blender of this invention to have a four-sided configuration, it is within the scope of the invention to alter the configuration, as would be obvious to one skilled in the art. For example, the chamber when cylindrical can be readily provided with baffle means to achieve the same flow pattern as is achieved by the various baffles illustrated. Likewise, while not specifically shown, the wall members can be hinged or otherwise adapted to allow access to the interior of the chamber as required for cleaning, etc. Further, while the preferred arrangement of the blending system has been disclosed, additional baffling can be added or multiple units of the same configuration can be employed, although not essential to achieving the desired degree of blending.

As illustrated, the system of the invention can achieve either a generally helical downward flow of the particles being blended or a "zig-zag" type flow. The particular flow pattern is determined by the angle of repose of the various baffling members within the chamber. Thus with each planar baffle 18, 19, 20, 21, 23 and 24 attached along the same level of attachment relative to the vertical axis of the chamber, a zig-zag effect is achieved. Whereas, if the angle of attachment of each of these plates is directed slightly downward toward the outlet, a generally helical flow pattern is achieved.

In operation, streams 25 and 26 are introduced into chamber 10 along the apex of dividing baffle 17. While two separate feed streams are illustrated, a single feed stream can be employed. The flow from the feed conduits 25 and 26 is caused to be divided by baffle member 17 with a portion passing over the opposite sides 17a, 17b of the baffle. A portion of the divided streams falls onto a continuous planar baffle member 18 which extends across the entire interior of the chamber 10 and is positioned with reverse angle with respect to baffle member 19. Baffle 18 extends to a point so that the material passing thereover will fall on baffle member 19 and the flow of the stream recombines the previously divided streams. A portion of the divided streams falls directly from divider 17 to baffle plate 19 and then combines with the material descending over baffle member 18. The stream of material then passes over baffle 19 and falls onto baffle 20, which is positioned below baffle 19 and slopes downwardly. The particle flow passes to baffle 21 which in turn introduces same to the centrally positioned flow dividing again the flow of material from plate 21 into two streams, which then flow over the sides 22a, 22b of the divider 22. Baffle members thereafter perform in a manner as baffle members 18 and 19. After passing over planar baffle 23, the blended particles are removed by means of outlet 16. Although not shown, recycle means can be adapted for use as required.

Reasonable variations of this invention can be made, or followed, in view of the foregoing disclosure and discussion, without departing from the spirit or scope thereof.

I claim:
1. Apparatus for blending particulate, free flowing, granular material which comprises, in combination, a chamber having first, second, third and fourth wall forming members, said wall forming members being so adapted as to form an outlet from said chamber at one end thereof; inlet means to introduce the material to be blended to said chamber; first flow dividing means attached to said first and third wall forming members at a point approximate to said inlet means; first planar baffle means attached along one edge thereof to said first wall forming member and adapted to direct flow downwardly toward the interior of said chamber; second planar baffle means attached along one edge to said third wall forming member at a point below the lower edge of said first planar baffle means; third planar baffle means attached along one edge thereof to said fourth wall forming member and so adapted as to direct flow downwardly toward the interior of said chamber; fourth planar baffle means attached along one edge thereof to said second wall forming member and so adapted as to receive flow from said third planar baffle member and to direct flow downwardly toward the interior of said chamber; and second flow dividing means attached to said second and fourth wall forming members so adapted as to divide the flow from said fourth planar baffle means while directing same downwardly toward the interior and outlet of said chamber.

2. The apparatus of claim 1 wherein there is additionally disposed in said chamber at a point below said second flow dividing means a fifth planar baffle means attached along one edge thereof to said third wall forming member and extending downwardly, and sixth planar baffle means attached to said first wall forming member and extending downwardly so as to direct flow to the interior of said chamber.

References Cited by the Examiner

UNITED STATES PATENTS

| | | | |
|---|---|---|---|
| 298,904 | 5/1884 | Sheppard | 259—180 |
| 1,473,165 | 11/1923 | Steigmeyer | 259—180 X |
| 2,179,485 | 11/1939 | Avril | 259—180 |
| 2,345,554 | 4/1944 | Burdett | 259—180 |

FOREIGN PATENTS 581,849  10/1946  Great Britain.

WILLIAM I. PRICE, *Primary Examiner.*